Aug. 7, 1962  H. F. PIERCE  3,048,169
METHOD OF FORMING CASTS MADE WITH PLASTIC FOAM MATERIAL
Filed Oct. 15, 1959  2 Sheets-Sheet 1
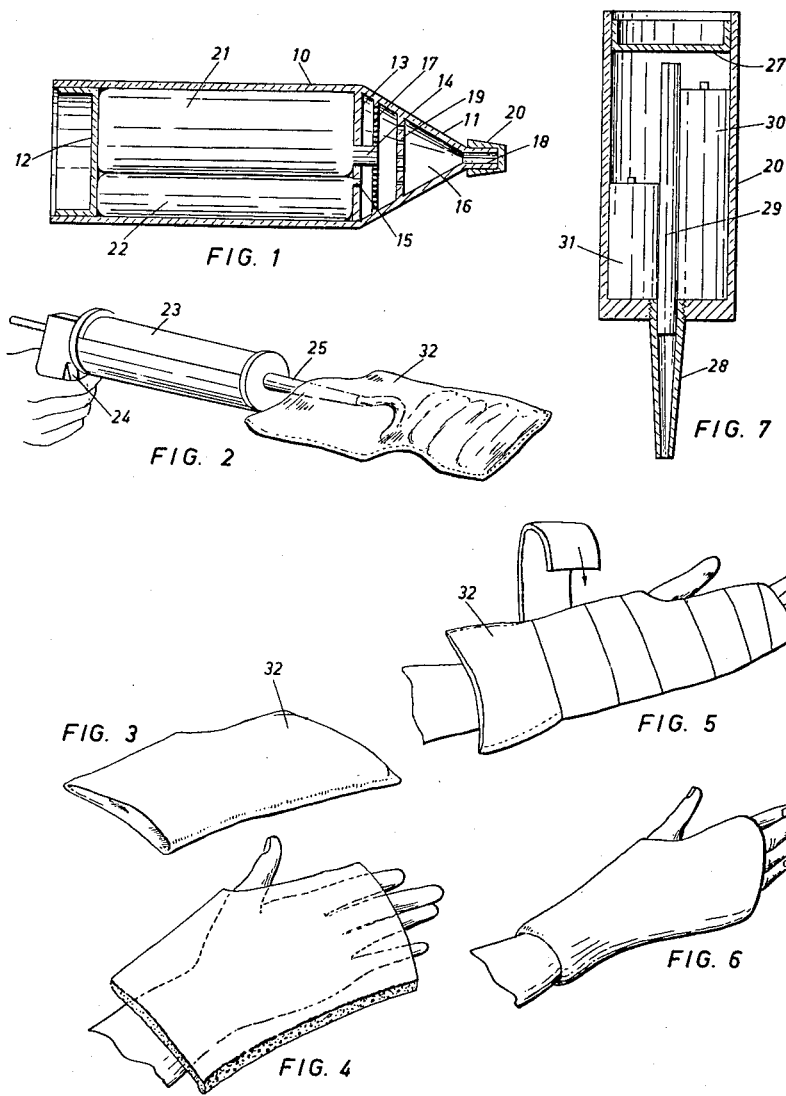
INVENTOR
HARRY F. PIERCE
BY George H. Riches
ATTORNEY Aug. 7, 1962 H. F. PIERCE 3,048,169
METHOD OF FORMING CASTS MADE WITH PLASTIC FOAM MATERIAL
Filed Oct. 15, 1959 2 Sheets-Sheet 2
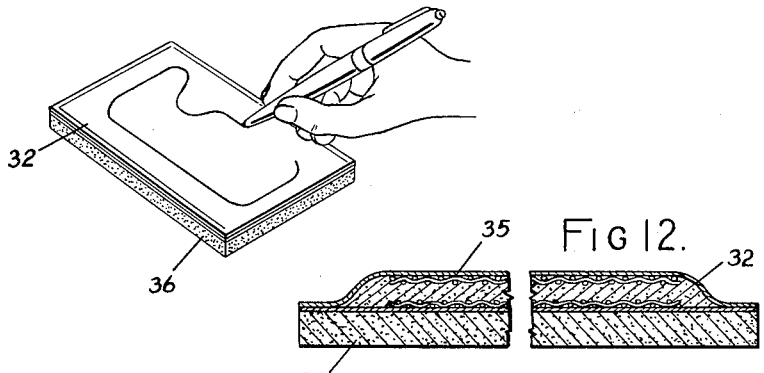
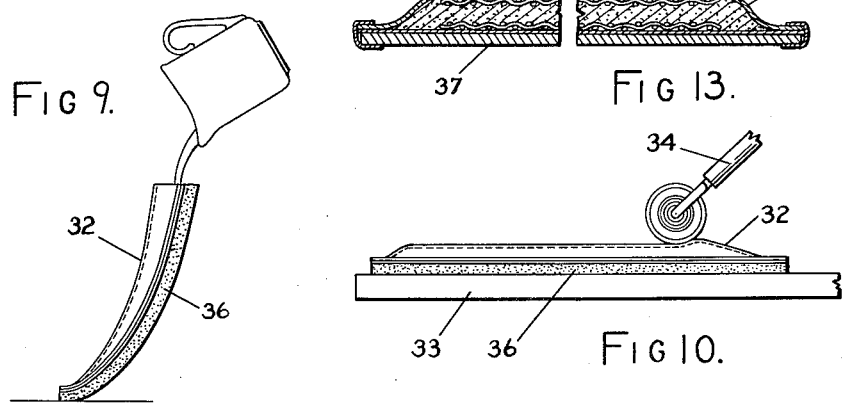
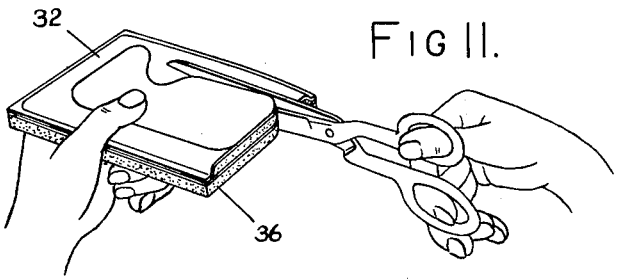
INVENTOR
HARRY F. PIERCE
BY
*George H. Rickes*
ATTORNEYS United States Patent Office 3,048,169
Patented Aug. 7, 1962

3,048,169
METHOD OF FORMING CASTS MADE WITH PLASTIC FOAM MATERIAL
Harry Feltus Pierce, Toronto, Ontario, Canada, assignor to Dura-Design Plastics Limited, Toronto, Ontario, Canada
Filed Oct. 15, 1959, Ser. No. 846,590
16 Claims. (Cl. 128—90)

This invention relates to a method of forming, in situ, on a living body, a cast made from a sheet of polymerized plastic or polymerized foam plastic of the kind herein described.

This application is a continuation-in-part of my United States application Serial No. 697,189, filed November 17, 1957, and now abandoned.

The object of the invention is to provide a cast material which is compact and self-contained for the entire preparation, not requiring water or any special equipment.

A further object of the invention is to provide a cast material which may be applied anywhere at any time and even in darkness, for example, to provide a cast material which can be applied under water.

A further object of the invention is to provide a cast which has excellent storage life in all climates, which is lightweight and buoyant in both fresh as well as salt water, such characteristics being very advantageous in military operations for the conveyance of casualties by land, air and water from weight considerations or where there is a risk of immersion in water.

A further object of the invention is to provide a cast material which is permeable to X-rays of an intensity used in medical radiology on a bare living body making it unnecessary to remove the cast when an X-ray examination is required.

A further object of the invention is to provide a cast material having the characteristic of being very light which characteristic is of great advantage in that it minimizes spasms of muscles and reduces fatigue caused by the presently used heavy plaster of Paris casts.

The splints and casts made with the material of this invention are comfortable and have a "warm feel." They also have a good appearance and can be any color desired. The colors can be used by doctors for code purposes if desired.

Another object of the invention is to provide a cast which is durable and easily washed, is non-conductive electrically, can be sterilized in an autoclave in dry heat or in boiling water, is non-toxic to the bare living body, has no allergy factor, does not support fungoid growth and is not affected by common solutions used in and around a patient, or by secretions.

A still further object of the invention is to provide a method of making casts which is clean and easily carried out.

Other and further advantages of the invention will be apparent from the following description and the accompanying drawings in which:

FIGURE 1 is a vertical cross-section of a suitable device for carrying out my method.

FIGURE 2 is a manually operating gun illustrating the first step of the method of forming the cast.

FIGURE 3 illustrates the foamed material ready for application to the body.

FIGURE 4 illustrates the foam material being applied to a hand.

FIGURE 5 shows the foam material being shaped to the hand, and

FIGURE 6 shows the finished cast.

FIGURE 7 shows an alternative apparatus to that shown in FIGURE 1.

FIGURES 8 to 13 diagrammatically illustrate an alternative method.

In the following specification when I use the term "plastic resin material" I mean a material which can be reacted in place in a self-contained reaction requiring no external agencies, such as pressure, heat and other factors uncomfortable or damaging to bare living bodies or members. The best material I know of at the present time which fulfills that requirement is polyurethane foam obtained by mixing a prepolymer or prepolymers and a catalyst and having the characteristics hereinafter mentioned.

The plastic resin material which is selected must have properties which will produce a finished cast permeable to X-rays of an intensity used in medical radiology on a bare living body and mouldable thereon at temperatures that are not uncomfortable to living bodies and having a density of about between 15 to 70 pounds per cubic foot.

Referring first to FIGURE 1, the apparatus for applying my method consists of a unit having a self-contained means for applying pressure to extrude and mix the plastic resin material.

It comprises a casing 10 having a nozzle 11 at one end and a hollow piston 12 housed at the other end. Within the piston is a $CO_2$ cartridge which can be set off when required, the expansion of the $CO_2$ moving the piston towards the nozzle end of the casing.

Adjacent the nozzle end of the casing is a wall 13 which is formed with an outlet 14 and an outlet 15 both of which communicate with the discharge passage 16 defined by the nozzle 11. Located within the nozzle and spaced slightly from the wall 13 is a fine meshed disc 17. Located between the disc 17 and the outlet 18 of the nozzle is a coarse perforated disc 19. The nozzle outlet 18 is closed by a cap 20. Contained within the casing is a sealed envelope 21 made of flexible plastic film containing the prepolymer or prepolymers and a similar sealed envelope 22 which contains a sufficient quantity of a catalyst that, when mixed with the prepolymer or prepolymers selected which will produce a plastic having the characteristics defined herein. When it is desired to produce a foamed plastic sheet a foam producing catalyst or agent is included.

Referring now to FIGURE 2, I have shown a modified caulking gun which contains envelopes similar to the envelopes 21 and 22 within the cylinder 23 of the gun, the necessary pressure to extrude the mixed material is applied by means of the trigger 24 through the nozzle 25. The gun will, of course, be provided with some suitable device for rupturing the envelope to allow the prepolymer or prepolymers and catalyst to intermix.

In FIGURE 7 I have shown a further alternative construction which consists of a flexible casing 20 which may be made of flexible plastic film, the casing being closed at one end by an end closure 27 and having at the other end a removable nozzle 28. Mounted within the casing and pressed into the nozzle 28 is a removable mixing rod 29 which also serves to divide the casing into two chambers 30 and 31 for containing, respectively, the prepolymer and the catalyst.

When it is desired to form a cast with the material contained within the chambers 30 and 31, the person doing so will remove the nozzle and the tube part way so that the rod 29 can be used to mix the prepolymer and the catalyst. When this mixing has been done the rod is thrown away and the nozzle put back in place. The foam material can then be extruded manually by squeezing the casing 26 to assist the natural extrusive action.

The manner of application is as follows and as the method is the same for each form of apparatus it will be described in relation to FIGURE 2.

In FIGURE 2 I have shown the plastic resin materials being extruded into a plastic envelope 32 which must be inert to the mixed material and also must not alloy passage or seepage of the material therethrough to the hands or person of the technician.

The plastic envelope is made in the form of a substantially flat rectangular pocket or bag, sealed along its edges except for an opening through which the mixture of the plastic resin materials is introduced.

Inside the envelope 32 are one or more thin flexible sheets 35 of reinforcing material on which the material is applied and which becomes embedded in the plastic resin. The sheets of reinforcing material may be a mesh of plastic or metal.

After the two materials have been intermixed they are extruded through the nozzle 25 into the envelope 32 by a to-and-fro motion so that there is a substantially uniform thickness of the plastic resin material in the envelope 32.

Since the material is in a state of fluidity and as it is contained within the impermeable envelope it can be worked in any other suitable way one of which is hereinafter described with reference to FIGURES 8 through 13 to form the plastic resin sheet of the required thickness. The sheet may or may not have uniform thickness since the particular application may require certain portions to be thicker than others. While in the fluid state the technician making the sheet can manipulate the smoothing device to accomplish that result.

The mixture reacts in the envelope to form a plastic resin sheet transparent to X-rays of an intensity used in medical radiology on a bare living doby and being mouldable to the shape of the part of the living dody to which it is applied at a temperature which will not injure the body. It will be seen from the drawings, e.g. FIGURES 2, 3 and 4, that the plastic resin sheet and envelope are appropriately shaped before applying to the body. This may be done by shaping the envelope before filling, or by cutting the resulting sheet material after it has passed through the tacky state, to the desired pattern as illustrated in FIGURES 9 through 13. When the envelope 32 is filled and smoothed, the material in the envelope will usually have reached the "rubbery" state. It is then allowed to set for a short time to reach a firm but pliable state. The resulting plastic resin sheet is then applied, for example, to the hand shown in FIGURE 4. The next step is to apply pressure to the plastic resin sheet to mould it to the shape of the hand. One way of doing this is to wind an elastic tape or bandage around the resulting plastic sheet on the hand for the two fold purpose of compelling the said sheet to conform to the shape of the hand and also to secure said sheet in place. The tape or bandage applies a uniform direct pressure to the member. Other similarly effective ways will be apparent to the operator.

The envelope 32 may be formed with a gusset along the sides which will add to the efficiency of controlling thickness and uniformity.

The resulting plastic resin sheet thus produced has thermoplastic properties and the feature of remouldability Consequently, after forming the resulting plastic resin sheet, it can be allowed to set in a flat form. Then when required for use, it can be reheated to a remouldable temperature, allowed to cool for a few seconds to lower the skin temperature of said sheet, trimmed to the desired shape and then moulded, as previously described around the part of the body to which it is to be applied. This can be repeated as often as desired.

In addition to the advantages previously mentioned, a cast made according to the method herein described fits snugly to the part of the body to which it is applied. It has high tensile and compressive strength, is light and compact, sets up quickly, requires no external heat for setting, has good electrical and heat insulation qualities, anti-biotics and antiseptics may readily be used with the material and does not crumble.

The plastic sheet with reinforcing mesh embedded therein has the following properties. The reaction of the prepolymer of prepolymers and catalyst to form the plastic sheet results in a rigid polyurethane foam plastic with thermoplastic properties of a density between 15 to 70 pounds per cubic foot, nonflammable, transparent to X-rays of an intensity used for bare living body so that a patient wearing the cast and being X-rayed, requires no greater intensity than if not wearing the same. The sheet has a thickness of approximately between $\frac{1}{16}''$ to $\frac{1}{2}''$ and approximately 15% to 50% of comparable weight of a similar cast made with plaster of Paris; non-toxic to living body and not affected by contact with the living body or liquids and temperatures commonly associated therewith an mouldable and remouldable at temperatures not harmful or injurious to living bodies.

In some cases, it may be desired to provide a cushion between the formed cast and the patient's body. In that case, a soft pad 36 preferably of foamed polyurethane is adhesively attached to the exterior of the envelope, usually before the mixture is introduced thereinto or it may be attached adhesively to the resulting sheet before moulding or remoulding.

A cast made according to my method can also be used to exert uniform direct pressure to use in place of tourniquets for the purpose of controlling haemorrhage and for splinting by direct uniform pressure.

Referring now to FIGURES 8 to 13 inclusive, I will describe the alternative method therein shown. The first step is to select an envelope of the size suitable for the particular application. Essentially, the size of the envelope to be used is determined by the size of the area to be covered. In every case the operator should use an envelope one or two inches longer than the estimated length of the area of the living body to be covered to provide a working margin if needed. The envelope 32 is substantially flat and rectangular in shape and sealed along its edges, leaving a portion unsealed to form a mouth. When desired to have the cast formed with a soft flexible lining, a sheet of such lining, preferable polyurethane foam, is adhesively attached to the envelope, If the soft lining is omitted, the envelope has attached thereto along the edges, a stiffener member 37 which holds the envelope taut and flat. The stiffening member is removed before the plastic resin sheet is applied to the body.

The first step is to trace the desired pattern on the plastic film of the envelope. The desired quantity of prepolymer or prepolymers where more than one is used, and the catalyst are poured into a mixing bowl with colouring if desired and vigorously and thoroughly mixed. The next step is to pour the mixture rapidly into the envelope allowing it to slide down over the reinforcing flexible mesh sheet or sheets inside the envelope against the side having the stiffening member or lining attached thereto.

The filled envelope is then laid flat on a table and the contents smoothed. In the present illustration the envelope is shown lying flat on the table 33 and being rolled with a roller 34. The rolling should be done in one direction only, that is, from the bottom of the envelope toward the open end, avoiding rolling material out of the open end of the envelope. A platen is placed on the envelope, after rolling, and the mixture pressed to uniform thickness within the envelope. There may, however, be cases which require the sheet material to have different thicknesses, in which case the technician will manipulate the roller and platen so that the required thickness and smooth outer surface is obtained.

When the plastic material within the envelope has passed through the tacky state so that the material will not adhere to a cutting instrument, the sheet is then cut along the pre-drawn pattern (FIGURE 11).

The sheet material is then placed on the patient, with the soft flexible pad, when one is used, next to the skin of the patient and the sheet is then moulded to the limb with hand manipulation, smoothing out any wrinkles that may develop. A snug fit to the limb is insured by wrapping with a cotton tensor bandage.

When the splint or cast has become rigid, the forming bandage is removed. The plastic envelope may be stripped off from the outer surface thus removing all pen markings and leaving the cast clean, glossy, colourful and attractive.

Another advantage of this invention is that splints, shells, or casts may be altered serially to suit the patient's progress by applying 250° F. of heat at the area to be altered. This may be accomplished by the use of an infra-red lamp or the cast may be placed in a household oven at the required temperature. Heat should be applied for four or five minutes at the end of which time a gradual adjustment should be effected by applying a steady but gentle pressure until the required alteration is achieved. As a general rule, the splint or cast is ready for alteration when the material possesses pliability similar to that possessed just before the original hardening of the material took place.

Any rough edges which may have resulted through uneven cutting of the pattern may be smoothed easily and quickly with a medium grade of sandpaper.

In some cases it may be desirable to prepare the plastic resin sheets in flat form or some standard body shapes and store them for subsequent moulding into a cast. In that event, the steps of forming the sheet are carried out down to the end of the smoothing operations as illustrated in FIGURE 10 or by the manufacturing procedures employing mechanical means for introducing the plastic resin material and the reinforcing mesh between flexible plastic film sheets in place of the envelope in a continuous manner.

The resulting plastic sheet having thermoplastic properties can be readily brought up to a remoulding temperature when required.

The unlined type, that is the ones without the soft flexible lining, can be dipped into boiling water to soften the plastic and after removing and allowing to cool for a few seconds, can then be applied in full contact with a living body while still pliable and flexible and remoulded without injury to the body by following the moulding and shaping step previously described.

As for the lined type, it should be heated in dry or moist hot air, such as an oven, until pliable, cut to shape while pliable and then applied to the living body and moulded to the shape required without injury to the body.

Subsequent applications of new prepolymer and catalyst mix while still liquid can be applied to the finished plastic sheet or cast and will bond thoroughly and become an integral part of said sheet. Thus welding and laminating procedure is possible for alteration, addition, attachment, strengthening and repair purposes.

What I claim as new and desire to protect by Letters Patent of the United States is:

1. A sheet material for making casts, splints and the like compirsing a plastic sheet formed by the reaction of a prepolymer and a catalyst, said sheet being transparent to X-rays of an intensity used in medical radiology on a bare living body and being mouldable to shape in direct contact with said bare living body at temperatures which are not harmful to said body and a flexible reinforcing sheet embedded in said sheet material.

2. A sheet material for making casts, splints and the like comprising a flexible envelope sealed along its edges with the exception of one edge to form a mouth, said envelope being impermeable to reacting plastic resins to be introduced therein, a plastic sheet formed by the reaction of a prepolymer and catalyst confined within the envelope, said envelope and sheet being transparent to X-rays of an intensity used in medical radiology on a bare living body and being mouldable to shape on a living body at temperatures which are not harmful to said body, and at least one flexible re-inforcing sheet embedded in the plastic sheet.

3. A sheet material according to claim 2 in which the flexible re-inforcing sheet is mesh like.

4. A sheet material for making casts, splints and the like comprising a flexible envelope sealed along its edges with the exception of one edge to form a mouth, said envelope being impermeable to reacting plastic resins to be introduced therein, a foamed plastic sheet formed by the reaction of a prepolymer and catalyst confined within the envelope, said envelope and sheet being transparent to X-rays of an intensity used in medical radiology on a bare living body and being mouldable to shape on a living body at temperatures which are not harmful to said body, and at least one flexible re-inforcing sheet embedded in the plastic sheet.

5. A new article of manufacture comprising a sheet material for making casts, splints and the like formed by the reaction of prepolymers and catalyst, said sheet being transparent to X-rays of an intensity used in medical radiology on a bare living body and being mouldable to shape in direct contact with said body at temperatures which are not harmful to said body and having a density of between 15 to 70 pounds per cubic foot and a flexible re-inforcing sheet embedded in said sheet material.

6. A new article of manufacture comprising a sheet material for making casts, splints and the like formed by the reaction of prepolymers and catalyst, said sheet being transparent to X-rays of an intensity used in medical radiology on a bare living body and being mouldable to shape in direct contact with said body at temperatures which are not harmful to said body and a soft flexible pad adhesively attached to said sheet material.

7. In the method of forming a cast directly on a living body, the steps of preparing a flexible envelope sealed along its edges except for a portion thereof to form a mouth and impermeable to the reacting plastic resins to be introduced thereinto; mixing a prepolymer and catalyst which on reacting will form a plastic transparent to X-rays of an intenity used in medical radiology on a bare living body, mouldable at temperatures non-injurious to the said body and non-toxic to the said body; introducing the mixture into said envelope through said mouth; allowing the mixture to react in said envelope and, while in a state of fluidity, smoothing said reacting mixture to form a substantially flat mouldable sheet.

8. In the method of forming a cast directly on a living body, the steps of preparing a flexible envelope sealed along its edges except for a portion thereof to form a mouth and impermeable to the reacting plastic resins to be introduced thereinto; mixing a prepolymer and catalyst which on reacting will form a plastic transparent to X-rays of an intensity used in medical radiology on a bare living body, mouldable at temperatures non-injurious to the said body and non-toxic to the said body and having a density of between 15 to 70 pounds per cubic foot; introducing the mixture into said envelope through said mouth; allowing the mixture to react in said envelope and, while in a state of fluidity, smoothing said eacting mixture to form a substantially flat mouldable sheet.

9. In the method of forming a cast directly on a living body, the steps of preparing a flexible envelope sealed along its edges except for a portion thereof to form a mouth and impermeable to the reacting plastic resins to be introduced thereinto; mixing a prepolymer and catalyst which on reacting will form foamed plastic transparent to X-rays of an intensity used in medical radiology on a bare living body, mouldable at temperatures non-injurious to the said body and non-toxic to the said body; introducing the mixture into said envelope through said mouth; allowing the mixture to react in said envelope and, while in a state of fluidity, smoothing said reacting mixture to form a substantially flat mouldable sheet.

10. In the method of forming a cast directly on a living body, the steps of preparing a flexible envelope sealed along its edges except for a portion thereof to form a mouth and impermeable to the reacting plastic resins to be introduced thereinto; mixing a prepolymer and catalyst which on reacting will form foamed plastic transparent to X-rays of an intensity used in medical radiology on a bare living body, mouldable at temperatures non-injurious to the said body and non-toxic to the said body, and having a density of between 15 to 70 pounds per cubic foot; introducing the mixture into said envelope through said mouth; allowing the mixture to react in said envelope and, while in a state of fluidity, smoothing said reacting mixture to form a substantially flat mouldable sheet.

11. In the method of forming a cast directly on a living body, the steps of preparing a flexible envelope sealed along its edges except for a part thereof which forms a mouth, said envelope being impermeable to the reacting plastic resins to be introduced thereinto and containing at least one flexible re-inforcing sheet; mixing a prepolymer and a catalyst which on reacting will form a plastic transparent to X-rays of an intensity used in medical radiology on a bare living body, mouldable at temperatures non-injurious to said body and non-toxic to said body; introducing the mixture into said envelope through said mouth; allowing the mixture to react in said envelope and, while in a state of fluidity, smoothing said reacting mixture to form a substantially flat mouldable sheet of plastic of the required thickness.

12. In the method of forming a cast directly on a living body, the steps of preparing a flexible envelope sealed along its edges except for a part thereof which forms a mouth, said envelope being impermeable to the reacting plastic resins to be introduced thereinto and containing at least one flexible re-inforcing sheet; mixing a prepolymer and a catalyst which on reacting will form a foamed plastic transparent to X-rays of an intensity used in medical radiology on a bare living body, mouldable at temperatures non-injurious to said body and non-toxic to said body; introducing the mixture into said envelope through the said mouth; allowing the mixture to react in said envelope and, while in a state of fluidity, smoothing said reacting mixture to form a substantially flat mouldable sheet of plastic of the required thickness.

13. In the method of forming a cast directly on a living body, the steps of preparing a flexible envelope sealed along its edges except for a part thereof which forms a mouth, said envelope being impermeable to the reacting plastic resins to be introduced thereinto and containing at least one flexible re-inforcing sheet; mixing a prepolymer and a catalyst which on reacting will form a plastic transparent to X-rays of an intensity used in medical radiology on a bare living body, mouldable at temperatures non-injurious to said body and non-toxic to said body, and having a density of between 15 to 70 pounds per cubic foot; introducing the mixture into said envelope through said mouth; allowing the mixture to react in said envelope and, while in a state of fluidity, smoothing said reacting mixture to form a substantially flat mouldable sheet of plastic of the required thickness.

14. In the method of forming a cast directly on a living body, the steps of preparing a flexible envelope sealed along its edges except for a part thereof which forms a mouth, said envelope being impermeable to the reacting plastic resins to be introduced thereinto and containing at least one flexible re-inforcing sheet; mixing a prepolymer and a catalyst which on reacting will form a foamed plastic transparent to X-rays of an intensity used in medical radiology on a bare living body, mouldable at temperatures non-injurious to said body and non-toxic to said body, and having a density of between 15 to 70 pounds per cubic foot; introducing the mixture into said envelope through said mouth; allowing the mixture to react in said envelope and, while in a state of fluidity, smoothing said reacting mixture to form a substantially flat mouldable sheet of plastic of the required thickness.

15. A sheet material for making casts, splints and the like comprising upper and lower flexible removable coverings impermeable to reacting plastic resins to be introduced therebetween, a plastic sheet formed by the reaction of a prepolymer and catalyst confined between the coverings, said coverings and sheet being transparent to X-rays of an intensity used in medical radiology on a bare living body and said sheet after removal of said covering being mouldable to shape in direct contact with said bare living body at temperatures which are not harmful to said body and a flexible reinforcing sheet embedded in said sheet material.

16. A sheet material for making casts, splints and the like comprising upper and lower film forming coverings impermeable to reacting plastic resins to be introduced therebetween, a plastic sheet formed by the reaction of a prepolymer and catalyst confined between the coverings said coverings and said sheet being transparent to X-rays of an intensity used in medical radiology on a bare living body and said sheet after removal of said covering being mouldable to shape in direct contact with said bare living body at temperatures which are not harmful to said body and a flexible reinforcing sheet embedded in said material.

References Cited in the file of this patent

UNITED STATES PATENTS

| | | |
|---|---|---|
| 2,092,910 | Daniels | Sept. 14, 1937 |
| 2,613,398 | Crowell | Oct. 14, 1952 |
| 2,692,596 | Marconnet | Oct. 26, 1954 |
| 2,761,443 | Parker | Sept. 4, 1956 |
| 2,800,129 | Van Swaay | July 23, 1957 |

FOREIGN PATENTS

| | | |
|---|---|---|
| 805,664 | Germany | May 25, 1951 |